United States Patent [19]
Iden, Sr.

[11] 3,831,976
[45] Aug. 27, 1974

[54] CARGO TIE-DOWN SYSTEM

[76] Inventor: Ray J. Iden, Sr., 6744 N. Lightfoot Ave., Chicago, Ill. 60646

[22] Filed: Nov. 17, 1972

[21] Appl. No.: 307,576

Related U.S. Application Data

[63] Continuation-in-part of Ser. No. 160,773, July 8, 1971, abandoned.

[52] U.S. Cl. .................. 280/179 A, 105/369 A
[51] Int. Cl. .................................... B60p 7/00
[58] Field of Search...280/179 A; 105/369 A, 369 R; 248/361 R

[56] References Cited
UNITED STATES PATENTS

| | | | |
|---|---|---|---|
| 2,047,503 | 7/1936 | Wilson | 105/369 A |
| 3,224,385 | 12/1965 | Elsner | 105/369 A |
| 3,422,508 | 1/1969 | Higuchi | 105/369 A |
| 3,713,616 | 1/1973 | Bowers | 105/369 A |

*Primary Examiner*—Robert R. Song
*Attorney, Agent, or Firm*—Edmond T. Patnaude

[57] ABSTRACT

A cargo tie-down system includes elongated tracks in which a plurality of fittings to which flexible straps are connected are slidably and irremovably mounted therein for preventing unauthorized removal of the fittings and straps.

8 Claims, 11 Drawing Figures

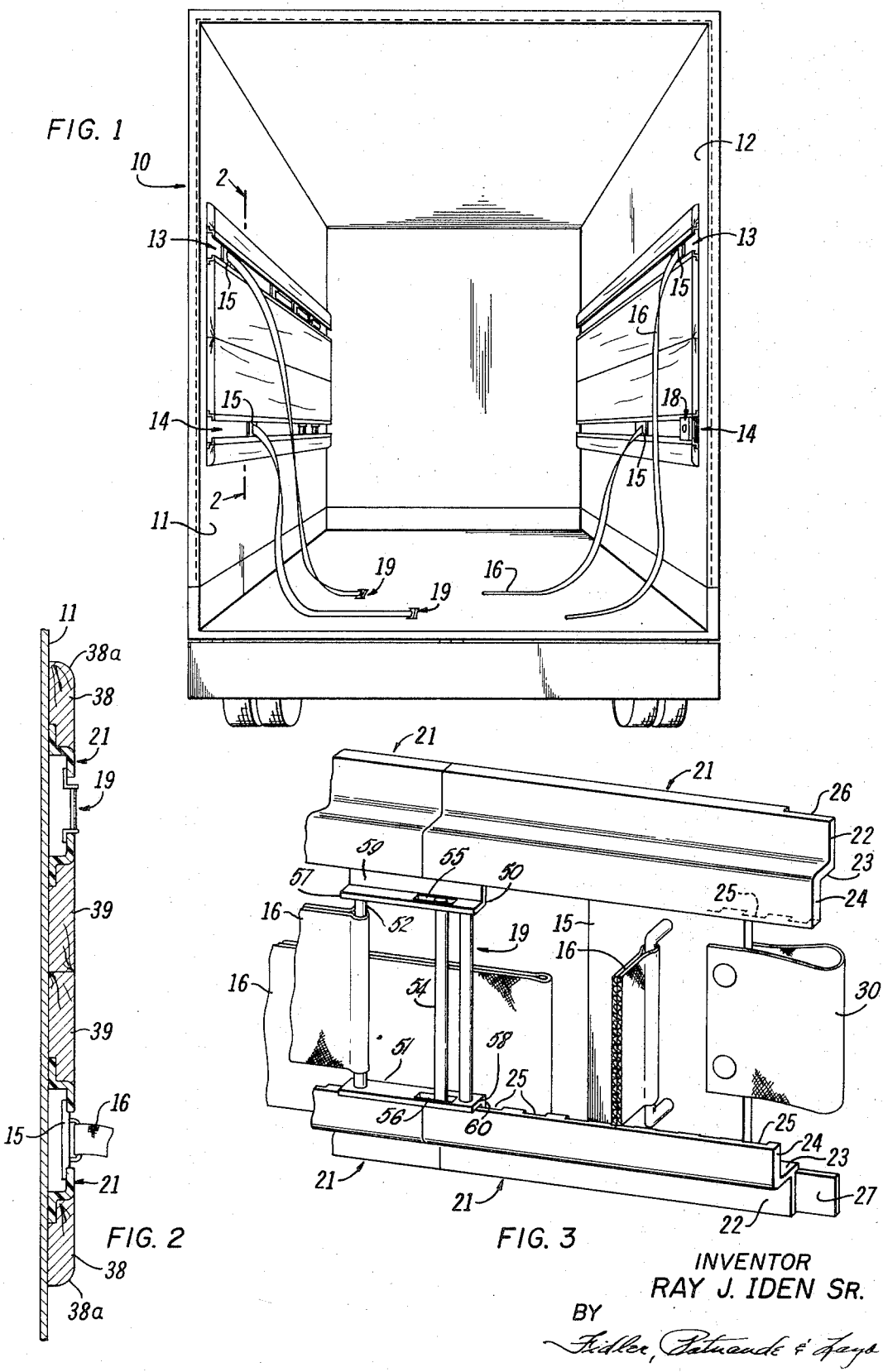

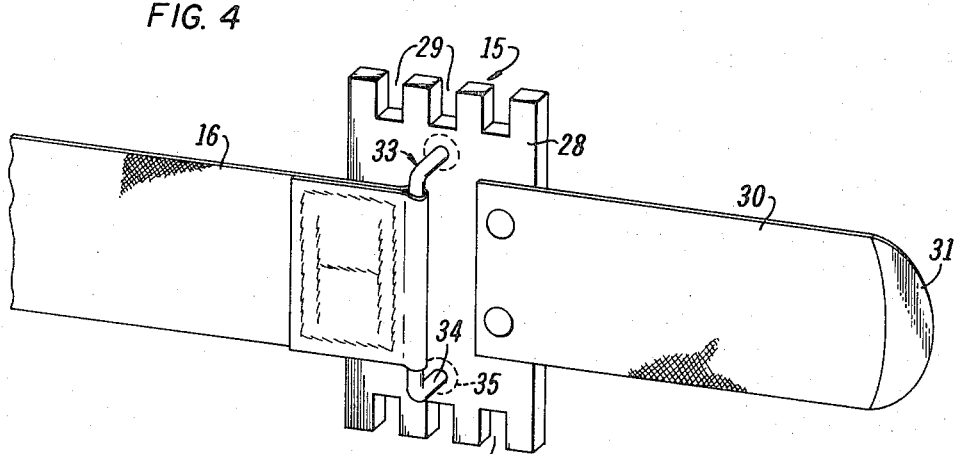
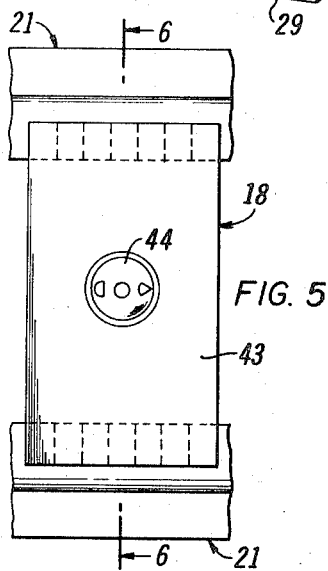
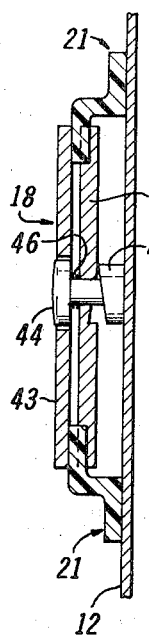
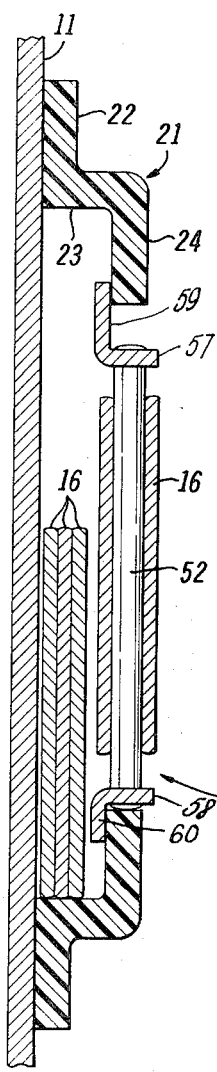
INVENTOR
RAY J. IDEN SR.

CARGO TIE-DOWN SYSTEM

This application is a continuation-in-part of application Ser. No. 160,773 filed by me on July 8, 1971.

The present invention relates in general to tie-down cargo systems, and it relates more particularly to a new and improved system which, as compared to the prior art, is lighter in weight, less expensive to manufacture and maintain, and wherein the straps cannot be readily removed from the associated track.

Over the years, various types of cargo tie-down systems have been developed to prevent cargo in transit from shifting. The systems most commonly used today employ a plurality of tracks secured to the walls of the storage compartment of the van or the like and fittings and straps are attachable to and removable from the tracks at selected positions therealong. Such systems are very effective for holding cargo in place, but they are complex in design and construction, expensive to manufacture and install, and because of pilferage of the straps and associated fittings they are also expensive to maintain.

An object of the present invention is, therefore, to provide a new and improved cargo tie-down system and parts therefor.

Another object of this invention is to provide a cargo tie-down system which inhibits unauthorized removal of the flexible straps from the associated vehicle or the like.

A further object of this invention is to provide a cargo tie-down system which is less expensive than that known in the prior art and which is, moreover, sufficiently versatile to be usable in a wide variety of applications.

Briefly, the above and further objects may be realized in accordance with the teachings of the present invention by providing a plurality of elongated tracks attachable to the walls of a van or the like; a plurality of strap fittings slidable along said tracks and removable from the tracks only at the open ends thereof; and locking means attached to the tracks at the open ends thereof to prevent unauthorized removal of the strap fittings and straps from the track. The straps are stowable in the tracks, and in one embodiment of the invention buckles provided on the straps incorporate flanges for holding the buckles in the tracks when not in use.

When using the system of this invention, a number of fitting and strap assemblies are placed in the tracks and the locking means are then fixed in place at the ends of the tracks. The fittings may then be slidably moved along the track to the desired locations of use, but cannot be removed from the vehicle without first removing the locking means. When each such location is determined during loading of the van, a fitting is adjustably located and fixed at such place along the track by means carried by the fitting. In one embodiment of the invention the associated strap is fastened to a like fitting on the opposite side of the van or to a strap connected to a like fitting on the opposite side of the van and tightened. When not in use, the straps and fittings remain in the track out of the way of the cargo.

Further objects and advantages and a better understanding of the invention may be had from the following detailed description taken in connection with the accompanying drawings, wherein:

FIG. 1 is a perspective view of the rear end of a van showing the cargo chamber thereof;

FIG. 2 is a cross-sectional view taken along the line 2—2 of FIG. 1;

FIG. 3 is a perspective view of a portion of the system of the present invention;

FIG. 4 is a perspective view of a strap fitting used in the system of the present invention;

FIG. 5 is a front elevational view of a locking device used in the system of the present invention;

FIG. 6 is a cross-sectional view taken along the line 6—6 of FIG. 5;

FIG. 7 is a cross-sectional view showing a buckle and strap stowed in the track;

Figure 8:
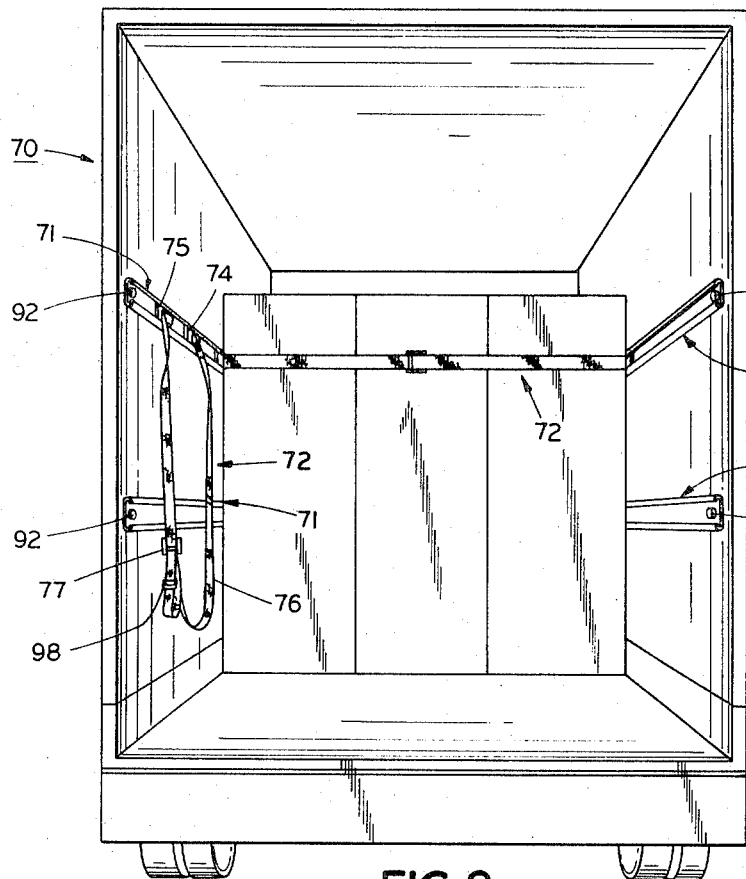
FIG. 8 is a perspective view of the cargo space in a van in which a tie-down system embodying the present invention is installed.

Referring now to the drawings and particularly to FIG. 1 thereof, there is shown, in perspective, the inside of a truck compartment 10 fitted with a cargo tie-down system embodying the present invention. Mounted along each sidewall 11 and 12 are a pair of horizontal tracks 13 and 14 each carrying a plurality of horizontally adjustable strap fittings 15 to which a plurality of flexible straps 16 are permanently fastened. The straps 16 are preferably a webbing of woven textile or synthetic fibers and, as described in greater detail hereinafter, are sewn to the fittings 15. The tracks are each formed by a plurality of identical rail sections which are of relatively short length and preferably formed of a strong and durable plastic material such as ABS. If desired, they may be formed of metal. The strap fittings 15 are adjustably movable along the tracks 13 and 14 and are provided with means for securing them in the adjusted positions. As shown, the forward ends of the tracks 13 and 14 abut the front end wall of the truck compartment, and therefore, the fittings 15, which can only be removed from the tracks by sliding the fittings out of the ends thereof, can only be removed through the rear ends of the tracks.

In accordance with an important feature of the present invention, a plurality of key-lock devices 18 are fitted into the open rear ends of the tracks, and when locked in place in the tracks, prevent removal of the fittings 15 and straps 16 from the vehicle. Hence, the person having the key may control the insertion and removal of the straps thereby minimizing the number of lost or stolen straps.

In one manner of use, the straps 16 from fittings 15 on one side of the truck are threaded through openings in like fittings on the other sidewall and secured to themselves by means of buckles 19 provided on each of the straps intermediate the ends thereof. In another manner of use, the buckles 19 are fastened to straps 16 from one side of the truck as shown in FIG. 1 and the straps 16 from the other side are attached thereto to hold the cargo in place. In the system of the present invention the buckles 19 are so constructed as to be stowable in the tracks 13 and 14 to prevent damage to the cargo by the unused buckles. Moreover, the unused straps 16 are also stowable in the tracks 13 and 14 and may be held in place therein by the associated buckles 19.

Referring now to FIGS. 2 and 3, the rail sections making up the tracks are each identified by the number 21 and comprise a mounting flange 22, a wall portion 23 and a flange portion 24 provided on its underside with a plurality of notches 25. When mounted on the walls of a truck or van in parallel spaced apart relationship as shown, the rails thus form a C-shaped channel opening toward the cargo space with the web portion of the channel being provided by the wall of the truck.

In order to facilitate alignment of the rail sections 21 and to provide a stronger and more durable track, the rail sections are provided with interlocking ends. As shown, one end of the mounting flange 22 is provided with a notched out section 26 on the bottom, and the other end is provided with a tongue-like extension 27 which fits into the notch 26 at the end of the next adjacent rail section.

As best shown in FIG. 4, the strap fittings 15 each include a flat plate 28 which may be molded of a suitable plastic such as ABS and having a plurality of notches 29 in the end surfaces thereof. The length of the plate 28 is slightly less than the distance between the walls 23 of the opposed rail sections making up the track and the thickness of the plate 28 is less than the corresponding dimension of the wall portions 23. Accordingly, when pressed against the wall of the compartment, the plate 28 may be slidably moved along the track to the desired location and then pulled outwardly so that the teeth at the ends of the plate 28 fit into the notches 25 in the track to prevent movement of the plate therealong.

A short length of flexible strap 30 is suitably secured to the plate 28 as by riveting and is used to secure the plate 28 in place. More particularly, the web has a thickness slightly greater than the distance between the wall and the rear side of the plate 28 when the teeth on the plate are interfitted with the notches 25. The strap is compressible and sufficiently resilient that it can be inserted behind the plate to secure it in place. To facilitate use of the strap 30 and to prevent fraying of the end thereof, a tapered metal end piece is fastened to the distal end thereof. The strap 30 may be a webbing of textile or synthetic fibers such as that from which the straps 16 are made.

A generally U-shaped metal wire piece 33 has end portions 34 which extend through openings in the plate 28, and the piece 33 is held in place by circular head portions 35 on the ends thereof. The heads 35 fit into circular recesses in the back side of the plate 28 so that the rear side of the plate remains flat and smooth. The wire piece extends forwardly of the plate a distance no greater than the thickness of the flange 24 forward of the notches 25 whereby the piece 33 does not protrude outwardly of the track. As shown, the strap 16 is secured to the piece 33 by means of a sewing operation.

The rail sections 21 are mounted on the wall of the truck or the like either by screws or by an adhesive, and if desired, the mounting flanges 21 may be covered with strips of plywood or other material. As best shown in FIG. 2, the flanges 21 of the uppermost and lowermost rail sections are covered by strips 38 routed out to receive the flanges and each having an outer surface lying flush with the outer surface of the flange 24. The distal edges 38a of the strips 38 are beveled to prevent damage to the cargo. A plurality of strips 39 are also grooved to receive the mounting flanges on the intermediate rail sections and to provide an outer surface which is planar and lies flush with the outer surfaces of the rail sections. By using the strips 38 and 39, the tracks 13 and 14 are effectively recessed to prevent damage to the cargo. Moreover, the strips 38 and 39 provide added strength for holding the tracks in place.

Referring now to FIGS. 5 and 6, it may be seen that the key-lock devices 18 each includes a rear plate member 42 which is basically the same in construction as the plate 28 and is preferably made in the same mold cavity. A front plate 43, which is rectangular in cross section, is connected to the plate 42 by a rotatable key-lock mechanism 44 having a cam member 45 disposed in a recess in the rear wall of the plate 42. Rotation of the mechanism 44 by means of a properly shaped key fitted therein rotates the cam 45 to move the plates together. A coil spring 46 is positioned between the plates 42 and 43 to move the plates apart when the mechanism 44 is rotated to the unlocked position whereby the locking device 18 may be slidably moved into the end of the track. When locked, the teeth in the rear plate are positioned in the notches 25 in the rail sections and are locked in place thereby to prevent unauthorized removal of the strap fittings 15 and associated straps 16 from the truck.

Referring to FIG. 7, a buckle 19 is shown stowed in the track over several lengths of strap 16. As shown in FIG. 3, the buckle 19 includes a pair of side members 50 and 51 in which the ends of a pair of fixedly positioned rollers 52 and 53 are journaled and secured. A movable roller 54 has its ends slidably mounted in slots 55 and 56 in the side members 50 and 51 and the strap 16 is looped over and secured as by stitching to the roller 52. The side members are L-shaped in cross section with the upstanding flanges 57 and 58 fitting between the distal edges of the opposed flanges 24 on the rail sections. The flanges 59 and 60 are provided for holding the buckles in the tracks when not in use. Accordingly, the flange 59 is substantially longer than the flange 60 so that the buckle 19 may be placed in the track by first inserting the upper flange 59 under the flange 24 on the upper rail section, then moving the lower flange into the channel and lowering it behind the flange 24 on the bottom rail section. The associated strap 16 may also be folded back upon inself and stored in the track behind the lower flange 24 as shown in FIG. 7. The buckle 19 is then placed over the stored strap to hold it in place and the strap 16 prevents undue vibration of the buckle in the track. Where the strap does not include a buckle it can still be stowed in the track even though it is not secured therein by means of a buckle.

Referring now to FIG. 8 wherein is shown the cargo space in a van 70, a plurality of identical rails 71 are mounted in parallel relationship on the interior walls surfaces of the van and a plurality of belt and fitting assemblies 72 are slidably mounted in the rails. For convenience of illustration only two belt assemblies 72 are shown but it will be understood that as many as twelve or more such assemblies will generally be used. Each belt assembly 72 comprises a first fitting 74 slidably mounted in one of the rails 72 and removable from the rail only through the open end thereof at the rear of the van; a second fitting 75 also slidable in a rail but removable from any intermediate location thereof; a single length of belting 76 permanently connected at its respective ends to the first and second fittings; and a lockable slide buckle 77 through which the belt 76 is looped for adjusting the effective length of the belt 76 between the fittings 74 and 75. Both of the fittings 74 and 75 are interlockable at selected positions along the rails and are held in interlocking relationship with the associated rail by means of short flexible straps carried by the fittings.

Figure 10:
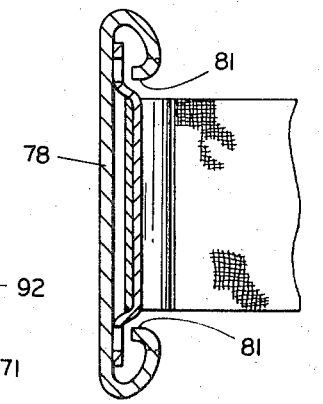
FIG. 10 is a sectional view of the rail of FIG. 9 with a fitting in slidable relationship therein.
Figure 11:
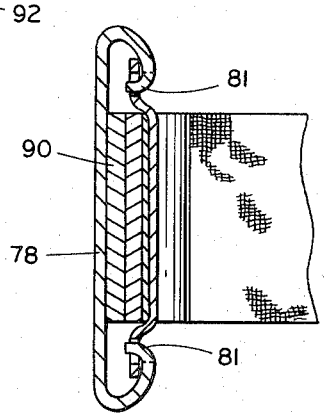
FIG. 11 is a view similar to FIG. 10 showing the fitting in interlocked relationship with the track.
Figure 9:
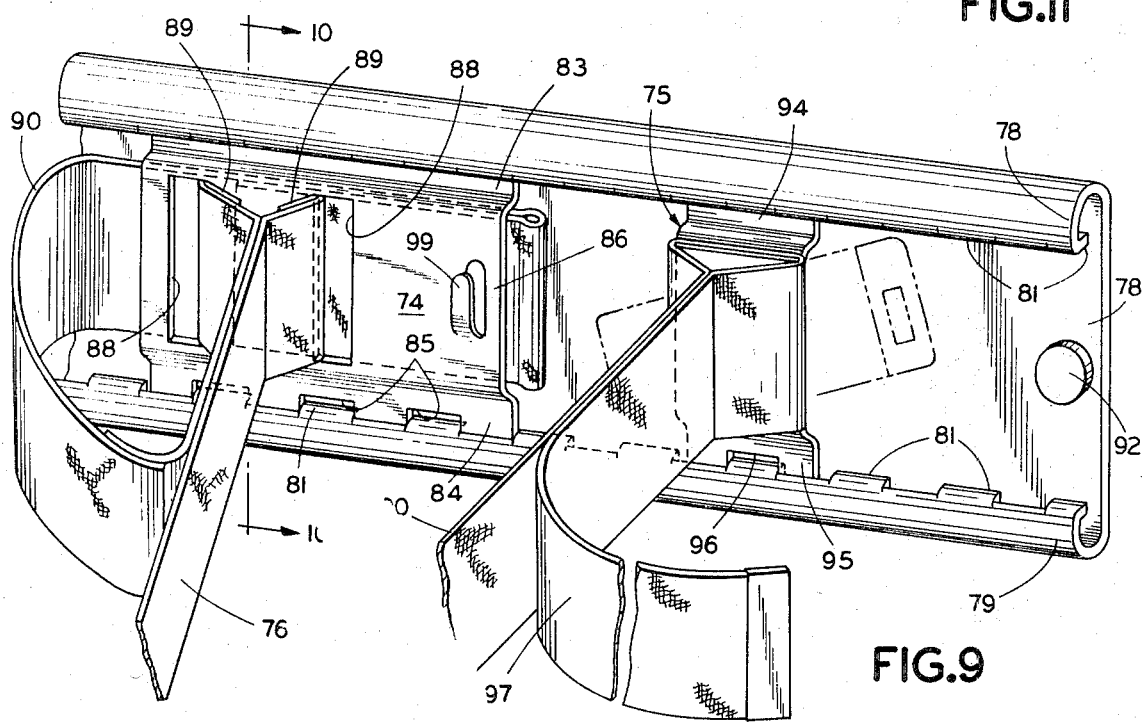
FIG. 9 is an enlarged fragmentary view of a track and associated fittings of the present invention.

Referring now to FIGS. 9, 10 and 11, the rail section as there shown is a metal channel member having a web 78 and reentrant flanges 79 and 80 each having a plurality of spaced apart teeth 81 which extend toward the web 78 in substantially perpendicular relationship therewith. The outer surfaces of the flanges 78 and 79 are smoothly curved so as not to damage any cargo which may be moved against the rails. If desired, however, the strips 38 and 39 shown in FIG. 2 may be used to cover the sides of the rails. The fitting 74 is a rigid plate having edge flanges 83 and 84 provided with rectangular openings 85 for receiving the teeth 81 to interlock the fitting 74 at a fixed position along the rail when the fitting is held outwardly away from the web 78. The fitting 75 is provided with a centrally disposed channel section 86 having a width slightly greater than that of the belt 76 which is permanently attached to the fitting through a pair of lateral openings 88. A pair of integral portions 89 provide smooth surfaces over which the belt 76 is fastened to prevent wear and fraying of the belt. A locking strap 90 is fastened to the belt 76 in proximity to the fitting and is positionable in the channel at the rear side of the fitting. When the strap 90 is doubled back upon itself between the fitting and the web 78 the fitting is held in the outward, interlocking condition. As shown, the fitting 75 is substantially longer than the width of the rail whereby it cannot be removed therefrom except by sliding it out through the end of the rail. Locking means such as studs 92 are secured at the rear open ends of the rails 71 to prevent unauthorized removal of the belt assemblies. If desired, key operated locks such as shown in FIGS. 5 and 6 may be used in lieu of the studs 92 where frequent removal or insertion of the belt assemblies are contemplated.

The fittings 75 are also rigid plate having edge flanges 94 and 95 provided with openings 96 for receiving the rail teeth 81 to lock the fittings 75 at fixed positions along the rails. A short flexible strap 97 is permanently fastened, as by sewing, to the belt 76 in proximity to each fitting 75 for holding the fitting away from the rail web 78 in interlocking engagement with the rail teeth 81. Like the fittings 74, the fittings 75 have a central channel section in which a portion of the belt 76 is disposed. The diagonal dimension of each fitting 75 is less than the width of the web 78 and the width of each fitting 75 is less than the minimum distance between the flanges 78 so that the fittings may be turned to the position shown in dotted lines in FIG. 9 and removed from or inserted in the rail.

OPERATION

In use, the article to be stowed is placed in the desired position in the van and a fitting 74 is pushed in toward the web 78 so that the rail teeth 81 are spaced from the flanges 83 and 84 and slidably moved along the associated rail into proximity therewith. The fitting 74 is pulled outwardly into locking engagement with the rail teeth and the strap 76 is inserted between the fitting and the web to lock the fitting 75 in place. The corresponding fitting is then moved along the same rail or placed in another rail and moved into proximity with the other side of the article and locked in place using the strap 97. The belt 76 is then tightened until it is in engagement with the article to hold it in place.

When not in use, the belt assemblies may be hung from the rails as shown in FIG. 8 by simply inserting the fitting 75 in a rail adjacent its associated fitting 74. Where necessary, the belt length can readily be adjusted so that the belt does not lie on the floor where it might be damaged. In addition, a loop 98 is sewn to the belt near the buckle 77 and a hook 99 is formed in each fitting 74 for receiving the loop 98 for hanging the belt and buckle in the associated fitting 74.

While the present invention has been described in connection with particular embodiments thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. A cargo tie-down system for restraining articles of freight in transit, comprising
    an elongated track having inwardly directed longitudinal flanges and a web defining a channel,
    a plurality of fittings mounted in said track for slidable movement therealong and having end flanges respectively underlying said longitudinal flanges,
    a plurality of flexible straps respectively fastened to said fittings,
    said longitudinal flanges and said end flanges having interlocking mutually engaging surfaces for preventing movement of said fittings along said channel when said end flanges are pressed against said longitudinal flanges in interlocking relationship therewith, and
    a plurality of lengths of flexible strap respectively carried by each of said fittings and insertable between said fittings and said webs to press and hold said fittings against said longitudinal flanges to maintain said interlocking surfaces in interlocking mutual engagement.

2. A cargo tie-down system for restraining articles of freight in transit, comprising
    an elongated track having inwardly directed longitudinal flanges and a web defining a channel,
    a plurality of fittings mounted in said track for slidable movement therealong and having end flanges respectively underlying said longitudinal flanges to prevent removal of said fittings from said track except at the ends thereof,
    a plurality of flexible straps respectively and permanently fastened to said fittings,
    said longitudinal flanges and said end flanges having interlocking mutually engaging surfaces in the form of spaced apart teeth and recesses for preventing movement of said fittings along said channel when said end flanges are pressed against said longitudinal flanges in interlocking relationship therewith, and
    means carried by said fittings for holding said end flanges in interlocking relationship with said longitudinal flanges.

3. A system according to claim 2 wherein said fittings each comprises
a generally rectangular flat plate, and a U-shaped strap receiving integral portion disposed between said longitudinal flanges.

4. A system according to claim 2 wherein said longitudinal flanges and said web are parts of an integral member,
said longitudinal flanges having teeth extending toward said web, and
said end flanges having openings for receiving said teeth,
said teeth being spaced from said web by a distance exceeding the thickness of said fittings.

5. A cargo tie-down system for restraining articles of freight in transit, comprising
an elongated track having inwardly directed longitudinal flanges and a web defining a channel,
a plurality of fittings mounted in said track for slidable movement therealong and having end flanges respectively underlying said longitudinal flanges, to prevent removal of said fittings from said track except at the ends thereof,
a plurality of flexible straps respectively and permanently fastened to said fittings,
said longitudinal flanges and said end flanges having interlocking mutually engaging surfaces for preventing movement of said fittings along said channel when said end flanges are pressed against said longitudinal flanges in interlocking relationship therewith,
means carried by said fittings for holding said end flanges in interlocking relationship with said longitudinal flanges, and
a second plurality of fittings respectively and permanently fastened to said straps,
said second plurality of fittings each having end flanges positionable between said longitudinal flanges and having surfaces adapted to interlockably engage said longitudinal flanges for inhibiting sliding movement thereof along said channels,
the width of said second plurality of fittings being less than the spacing between said longitudinal flanges in interlocking relationship therewith to permit insertion and removal thereof with respect to said channel at intermediate locations thereof.

6. A system according to claim 5 comprising
a plurality of buckle means respectively connected to said straps intermediate said fittings for adjusting the effective lengths of said straps between the associated fittings.

7. A cargo tie-down system for restraining articles of freight in transit, comprising
an elongated track having inwardly directed longitudinal flanges and a web defining a channel,
a plurality of fittings mounted in said track for slidable movement therealong and having end flanges respectively underlying said longitudinal flanges to prevent removal of said fittings from said track except at the ends thereof,
a plurality of flexible straps respectively and permanently fastened to said fittings,
said longitudinal flanges and said end flanges having interlocking mutually engaging surfaces for preventing movement of said fittings along said channel when said end flanges are pressed against said longitudinal flanges in interlocking relationship therewith,
means carried by said fittings for holding said end flanges in interlocking relationship with said longitudinal flanges,
a first member slidable in said channel and having end flanges underlying said longitudinal flanges, and
a key-lock means mounted to said first member for locking said end flanges in fixed engagement with said longitudinal flanges.

8. A system according to claim 7 wherein said key-lock means comprises
a plate overlying the outer surfaces of said longitudinal flanges, and
key operated means for urging said first member and said plate together to clamp said longitudinal flanges therebetween.

* * * * *